United States Patent [19]
Ott

[11] Patent Number: 5,557,879
[45] Date of Patent: Sep. 24, 1996

[54] ANT SHOCKING APPARATUS

[76] Inventor: Russell J. Ott, 9050 Briarclift Rd., Indianapolis, Ind. 46256

[21] Appl. No.: 391,056

[22] Filed: Feb. 21, 1995

[51] Int. Cl.$^6$ .................................................. A01M 1/22
[52] U.S. Cl. ................................................................ 43/112
[58] Field of Search ............................ 43/112, 121, 108

[56] References Cited

U.S. PATENT DOCUMENTS

| | | | |
|---|---|---|---|
| 922,377 | 5/1909 | Ames | 43/98 |
| 1,045,662 | 11/1912 | Balint | 43/98 |
| 2,191,229 | 2/1940 | Ford | 43/98 |
| 2,576,118 | 11/1951 | Holte | 43/112 |
| 3,835,577 | 9/1974 | Soulos | 43/112 |
| 4,423,564 | 1/1984 | Davies et al. | 43/121 |
| 4,471,561 | 9/1984 | Lapierre | 43/112 X |
| 4,474,229 | 5/1988 | Chambers | 43/112 |
| 4,756,116 | 7/1988 | Cutter | 43/112 X |
| 4,839,984 | 6/1989 | Saunders et al. | 43/112 |
| 4,869,015 | 9/1989 | Murakami et al. | 43/112 |
| 4,907,365 | 3/1990 | Conigliaro, Jr. | 43/112 |
| 4,914,854 | 4/1990 | Zhou et al. | 43/112 |
| 4,980,990 | 1/1991 | Hiday | 43/122 |
| 5,107,620 | 4/1992 | Mahan | 43/112 |
| 5,269,091 | 12/1993 | Johnson et al. | 43/112 X |
| 5,280,684 | 1/1994 | Filonczuk | 43/112 X |

FOREIGN PATENT DOCUMENTS

| | | | |
|---|---|---|---|
| 597751 | 4/1978 | Switzerland | 43/112 |

*Primary Examiner*—J. Elpel
*Attorney, Agent, or Firm*—Woodard, Emhardt, Naughton, Moriarty & McNett

[57] ABSTRACT

A control unit has two metal cylinders of the same diameter held with a narrow gap between facing ends, by a cylinder of electrical insulating material. Two nine volt dry cells in series establish a potential across the gap. One embodiment of the unit has an eyelet at the top which is attached to a string hung from an overhead support. Another eyelet is at the bottom and attaches a string which hangs a hummingbird feeder. Ants crawling down the supporting string for the unit toward the bird feeder hanging from the bottom of the unit will be stunned and bounced off the assembly as they attempt to cross the gap. In another embodiment, the cylinders are mounted on the cover of a canister immediately below a hole in the center of the cover so that, as the ants crawl down through the hole in the cover toward an attractant in the canister, they will be stunned and fall into the canister.

6 Claims, 5 Drawing Sheets

5,557,879

ANT SHOCKING APPARATUS

BACKGROUND OF THE INVENTION

1. Field of the Invention

This invention relates generally to pest control apparatus, and more particularly to a method and means for control of ants.

2. Description of the Prior Art

Some kinds of ants in some circumstances can be dangerous to humans, other animals, plants or structures. Other kinds of ants in other circumstances might be no more than perceived as a nuisance. In either case, where humans are involved, control of ants is usually considered desirable. Many arrangements including mechanical, electrical, and chemical products or combinations thereof, have been devised for insect control. It seems that most of them are intended to actually kill the insect, some with associated trapping and/or collecting provisions. For example, U.S. Pat. No. 5,280,684 issued Jan. 25, 1994 discloses a receptacle containing an insect-attractant therein and a cover with insect access holes with associated electrical grids to kill entering insects which then fall into the receptacle. Considering the result to be accomplished, that device is a little complicated considering the number and nature of parts involved. The present invention is intended to provide a more expedient way to control ants in various environments.

SUMMARY OF THE INVENTION

Described briefly, according to illustrated embodiments of my invention, two metal cylinders of the same diameter are located in an end-facing-end relationship on a common axis with a cylinder of electrical insulating material secured to the metal cylinders and holding them in longitudinally spaced relationship with a narrow gap between facing ends of the cylinders. An electrical potential difference is provided across the gap by a battery comprising one or more low-voltage dry cells with a positive terminal connected to one of the metal cylinders and a negative terminal connected to the other metal cylinder. In one embodiment of this invention, the assembly is placed in line between an overhead support and a hummingbird feeder so that ants crawling down the supporting string for the control assembly toward the bird feeder hanging from the control assembly will be caused to lose their grip and drop or be bounced off the assembly as they attempt to cross the gap, and fall to the ground. In another embodiment, the cylinders are mounted on the cover of a canister immediately below an opening in the center of the cover so that, as the ants crawl down through the hole in the cover in an effort to get to an attractant in the canister, they will be caused to lose their grip and fall into the canister.

DESCRIPTION OF THE PREFERRED EMBODIMENT

Figure 1:
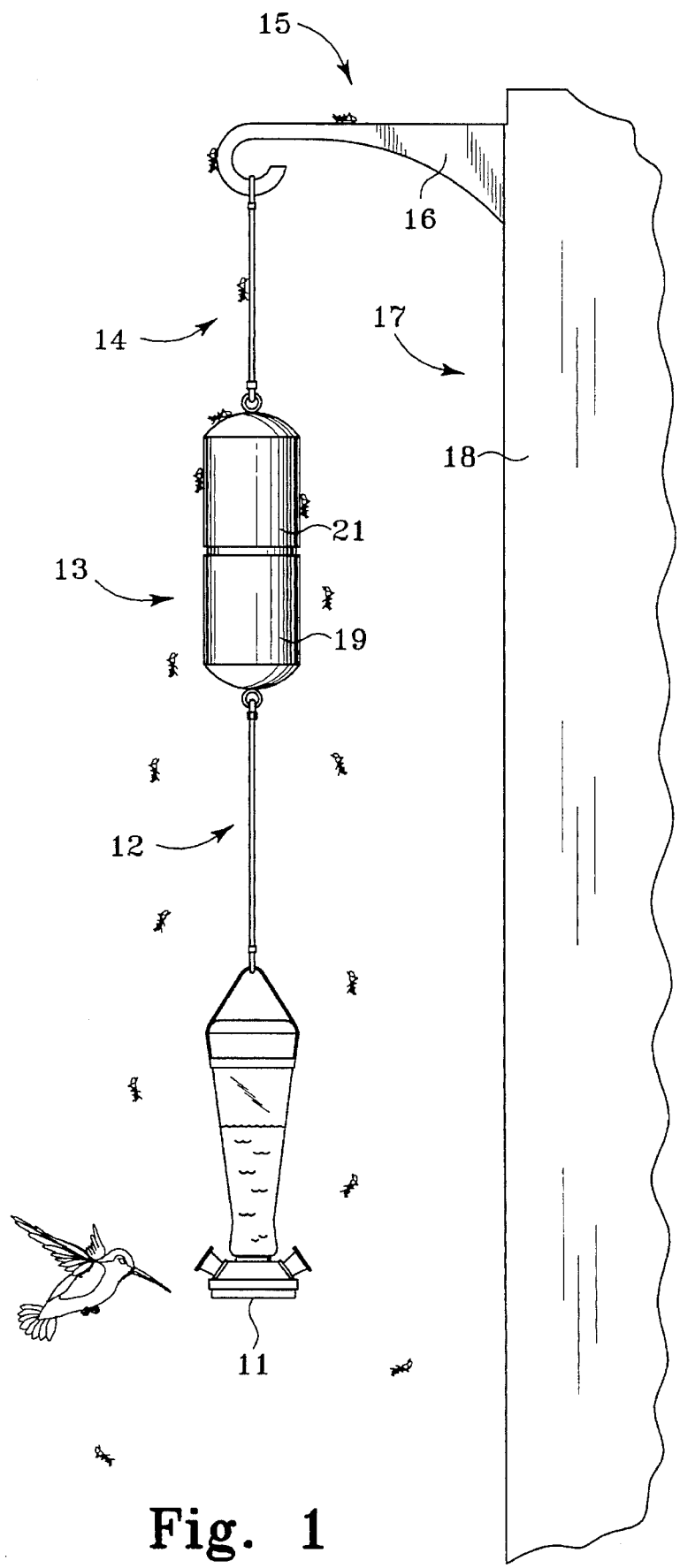
FIG. 1 is an elevational view of one embodiment of the invention incorporated in ant control apparatus with a hummingbird feeder.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the drawings in detail, FIG. 1 shows a hummingbird feeder 11 hanging from a strand 12, the ant control device 13, a further strand 14, and an overhead support arm 15 specifically illustrated in the form of a bracket 16 extending outward from a vertical support column 17 specifically illustrated in the form of a building wall 18. The support strands 12 and 14 can be any of a variety of materials, natural or artificial fiber or leather, being a few examples. The support column and arm can be a tree and branch or any other suitable arrangement.

The ant control device shown comprises a couple of cylindrical cups 19 and 21 with their upper and lower edges 22 and 23, respectively, facing each other and spaced to form a gap 24 between them. These cups are maintained in alignment on a common axis 26 by a cylinder 27 of electrically non-conductive material. In the illustrated example, these cups 19 and 21 are press fitted onto the cylinder 27 and the facing ends 22 and 23 are spaced as desired to provide a gap width suitable to control the type of ants typically descending the strand 14 toward the attractant in hummingbird feeder 11. For example, the width of the gap can be from 0.5 mm to 2 mm.

Further regarding the illustrated example, the cylinder 27 is illustrated as a plug with an aperture 28 extending through it from the top 29 to the bottom 31. A nine volt dry cell 32 is mounted in a spring clip 33 fastened to the top of plug 27. Similarly, a dry cell 34 is received in a spring clip 36 fastened to the bottom of the plug 31. These dry cells are connected in series as indicated by the polarity designations on them, with the positive terminal 37 of dry cell 32 received in a socket 38 wired at 39 to the metal wall of cup 21. Similarly, the negative terminal socket 41 of dry cell 34 receives a plug 42 wired at 43 to the metal wall of cup 19. Therefore, an eighteen volt potential difference is present across the gap 24. Consequently, when an ant crawling down a path defined by the wall of cup 21 toward the feeder proceeds across the gap 24, and makes contact with cup 19 simultaneously with continued contact with the cup 21, it will be shocked and bounce off the assembly and fall to ground. Accordingly, the ants are not able to pass onto the cup 19 and will be precluded from reaching the strand 12 and hummingbird feeder 11.

Typically the material for the cups 19 and 21 is spun aluminum. The material for the cylindrical plug 27 is nylon. When the batteries need replacement, it is only necessary to pull the cups off the spacer cylinder 27 and place new batteries in the clips 33 and 36. Of course the wire 40 connecting the positive terminal of battery 34 with the negative terminal of battery 32 must be long enough to permit removal of these cups from the cylinder 27, so it is important that this wire be insulated as is also desirable for the other wires 39 and 43 to prevent inadvertent contact and premature shorting of the battery system during assembly.

Figure 2:
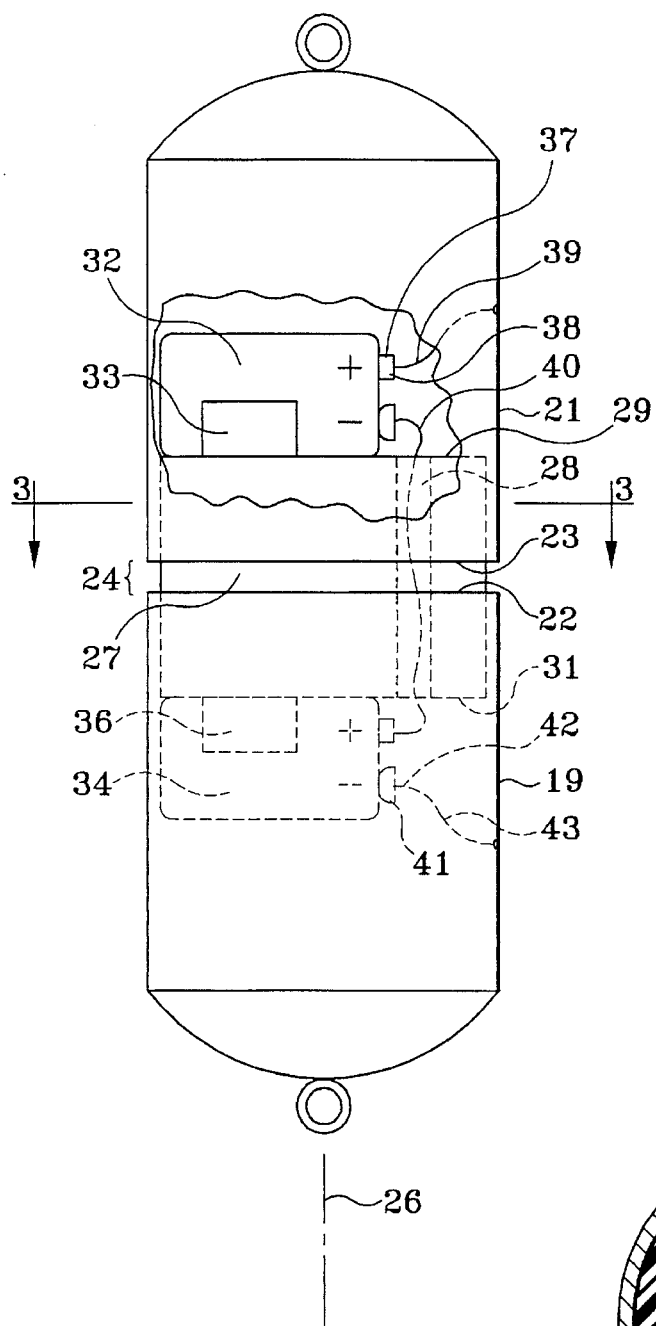
FIG. 2 is an enlarged elevational view of the control device of FIG. 1 with a portion of the wall broken out to show interior details.
Figure 3:
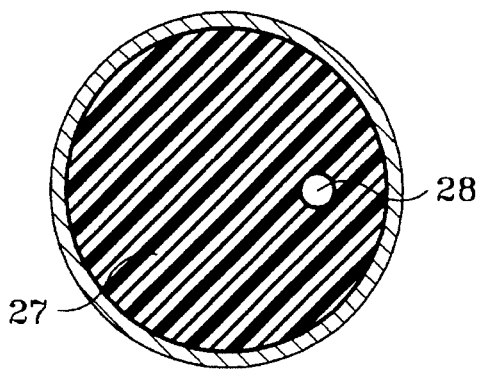
FIG. 3 is a cross section taken at line 3—3 in FIG. 2 and viewed in the direction of the arrows.
Figure 4:
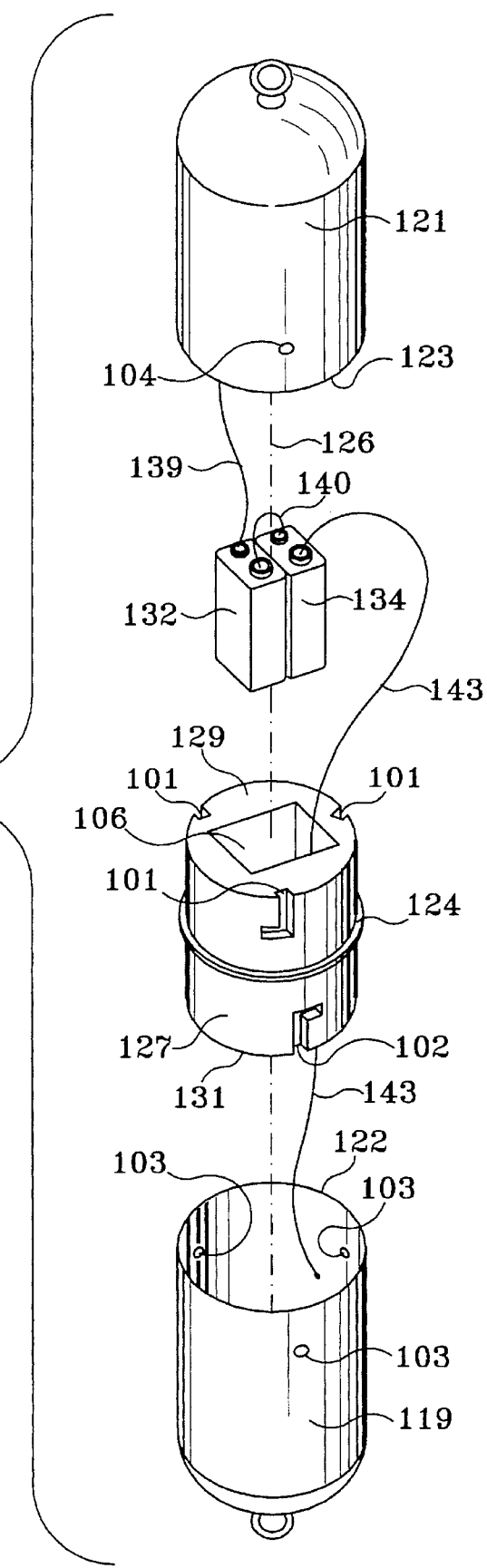
FIG. 4 is an isometric exploded view of a second embodiment of the invention.

Referring now to FIG. 4, the ant control device includes components having some similarities to those in FIGS. 1–3 so will be identified with similar reference numerals but in a 100 series. In this instance, the non-conductive plastic plug 129 has three sets of bayonet-type slots 101 intercepting the upper end of the plug and extending down the outer wall and having a short arm at the bottom. Similarly, a set of three bayonet-type slots 102 (only one being shown in the drawing) extend upward from the lower end 131. The slots 102 receive the inner ends of pins 103 in the wall of the lower cup 119, whereby the lower cup can be installed on the lower end portion of the plug 127. Similarly, three circularly spaced pins 104 in the upper cup 121 project into the slots 101 and can be anchored in those slots with a short turn about the axis 126. The plug includes integral rib 124 between the upper end 122 of the lower cup and the lower end 123 of the upper cup and which defines the gap width. Of course, it is non-conductive.

The dry cells 132 and 134 are received in the central aperture 106 of the plug 127 and may be supported therein by tape across the bottom of the cells and the bottom of the plug, the plug height being equivalent to that of the cells with their top terminals. The cells may be not only snug in the bore 106, but also supported by the tape therein to remain firmly in place. The electrical conductors from these two nine volt cells are 139 to the upper cup wall and 143 through the aperture 106 down to connection to the lower cup wall. Being nine volt cells, they provide the electrical battery potential difference across the gap defined by the insulating rib 124 to interfere with the passage of ants downward from cup 121 to cup 119.

It should be understood that in both the embodiments of FIGS. 1–3 and that of FIG. 4, the cups need not be entirely of aluminum, as some other conductive material or a plastic with an exterior coating of conductive material on both sides of the rib 124 and in electrical communication with the conductors 139 and 143 from the battery, might also be used and serve the intended purpose of causing the ants traversing the gap to lose their grip and drop to the ground.

Figure 5:
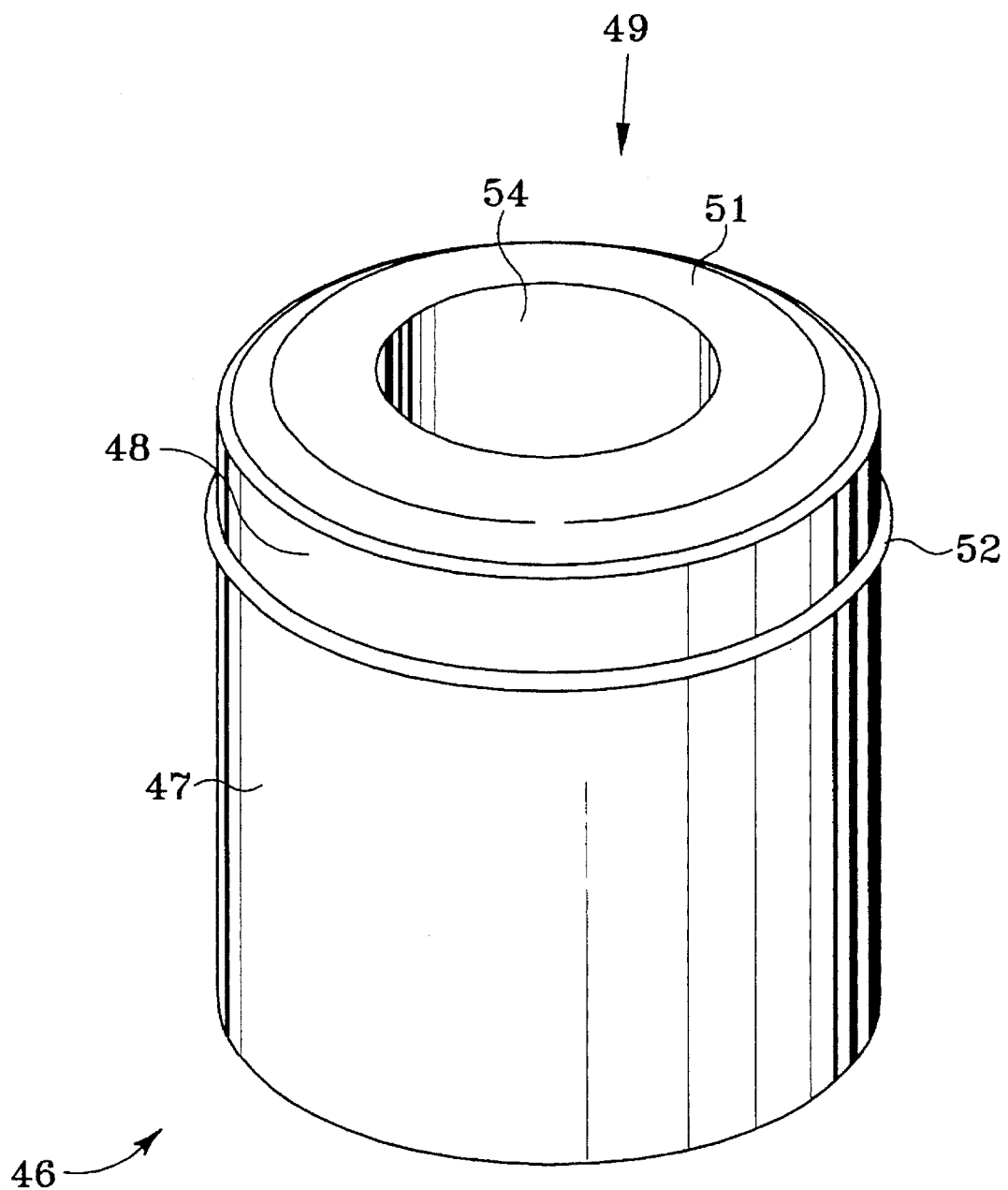
FIG. 5 is an isometric view of a third embodiment of the invention.
Figure 6:
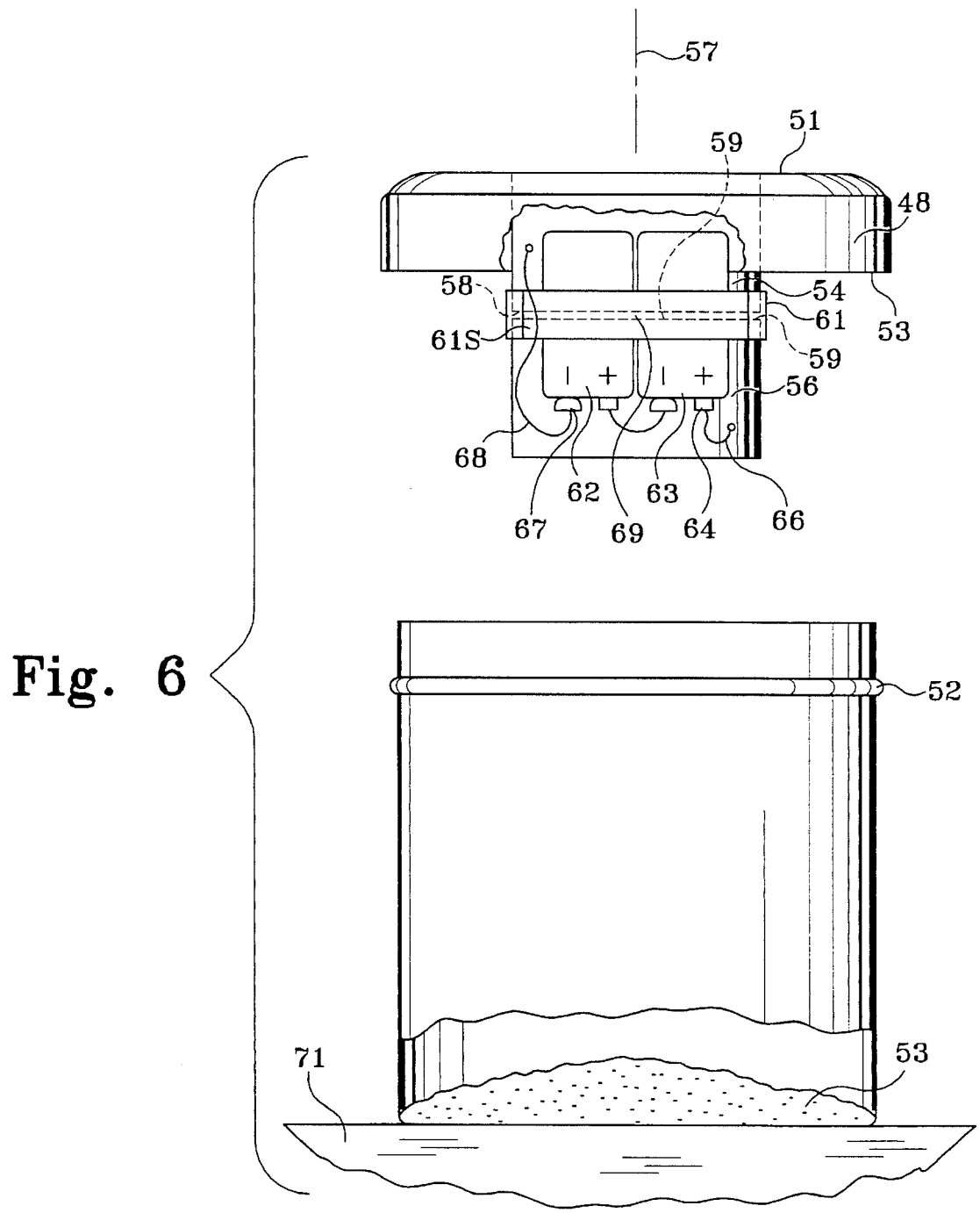
FIG. 6 is an elevational exploded view of the third embodiment of the invention.

Referring now to FIGS. 5 and 6, canister 46 includes an upwardly opening cup 47 with a downwardly opening cup 48 received thereon and providing a lid. Cup 48 has a hole 49 in the top 51, while cup 47 has a flange 52 serving as a stop for the lower edge 53 of the lid 48. An attractant material 53 for ants is piled on the bottom of the cup 47.

A metal cylinder 54 is secured in the lid 48 by soldering to the lid at the hole 49 or can actually be formed from the metal at hole 49 in the lid. A second metal cylinder 56 is provided immediately under the cylinder 54 and has the common axis 57 with the upper cylinder 54. The lower edge 58 of cylinder 54 is closely spaced from the upper edge 59 of cylinder 56, providing a gap between them. A sleeve 61 of electrically non-conductive material is secured fitted to both of the cylinders, holding the lower cylinder 56 in suitably spaced relation to the upper cylinder to provide the desired gap width as discussed above with reference to FIGS. 1–4. The sleeve can be a sturdy adhesive tape that, while flexible enough to wrap around the cylinders, has sufficient column strength when so wrapped and adhesively attached, to hold the lower cylinder 56 in suspended relationship to the upper cylinder 54 and reliably keep the gap between edges 58 and 59 constant, even if the lid assembly is removed from the cup 47 and temporarily placed on a countertop, while cup 47 is emptied or filled with fresh attractant.

In the FIG. 6 embodiment, tape 61 has a strip of VELCRO-type hook and loop fabric fastener tape wrapped around it and which, being provided with a VELCRO-type hook and loop fabric fastener outer surface, secures two 9 volt dry cells 62 and 63 together around the outside of tape 61 by the overlapping strap portion 61S wrapped around it. The cells are connected in series. The positive terminal of dry cell 63 is received in a socket 64 wired at 66 to the lower cylinder 56 whereby the potential at the socket 64 is applied to the cylinder 56. Similarly, a plug 67 wired at 68 to the ring upper cylinder 54 is received in the negative socket of battery 62. Consequently, the potential difference between the socket 64 connected to the positive terminal of battery 63, and plug 67 connected to the negative terminal of battery 62 (approximately eighteen volts), is provided across the gap 69. Therefore, when an ant crawls up from a countertop 71 or the like and across the top 51 of the canister toward the hole 49 in an effort to reach the attractant 53, it will crawl down the path defined by the wall of the cylinder 54. Upon traversing the gap 69, the ant will be stunned, lose its grip and fall into the container 47.

In this embodiment of the invention, it is not necessary that the container 47 or lid 48 be made of or coated with a conductive material but it is desirable that the rings 54 and 56 either be made of a conductive material or at least have conductive material on the marginal portions facing the gap 69 in order for them to achieve the desired result. The same is true of the embodiment of FIGS. 1–4 in the respect that the exterior surfaces at marginal portions adjacent edges 22 and 23 must be electrically conductive and connected to the respective battery terminals so that an ant traversing the gap will be appropriately stunned. Also, it is necessary that the gap not be so wide in either embodiment for the ant or other insect whose travel is to be interrupted, to be able to cross it without simultaneously contacting both of the oppositely polarized electrically conductive surfaces at the opposite sides of the gap. Thus, a gap width of one/half to two millimeters is believed best for most installations.

The dry cells chosen for this invention should be of a conventional nature having not only a relatively low voltage rating, but also a low power rating to avoid the possibility of injury to humans. Nine volt DURACELL brand dry cell brand is an example.

While the invention has been illustrated and described in detail in the drawings and, foregoing description, the same is to be considered as illustrative and not restrictive in character, it being understood that only the preferred embodiment has been shown and described and that all changes and modifications that come within the spirit of the invention are desired to be protected.

What is claimed is:

1. Ant control apparatus comprising:

first and second cylinders longitudinally spaced along an axis, establishing a circumferential gap between the cylinders, the cylinders having electrically conductive marginal portions at the gap;

an electric battery having a positive terminal electrically connected to the marginal portion of one of the cylinders and a negative terminal electrically connected to the marginal portion of the other cylinder and establishing a voltage differential across the gap;

an electrical insulator secured to the cylinders, and holding them in the longitudinally spaced relationship; and wherein:

the first cylinder has a closed top forming a downwardly opening cup;

the second cylinder has a closed bottom forming an upwardly opening cup.

2. The apparatus of claim 1 and wherein:

the insulator holds the cylinders to maintain the gap width between 0.5 mm and 2.0 mm.

3. Ant control apparatus comprising:

first and second cylinders longitudinally spaced along an axis, establishing a circumferential gap between the cylinders, the cylinders having electrically conductive marginal portions at the gap, the first cylinder having a top;

an electric battery having a positive terminal electrically connected to the marginal portion of one of the cylinders and a negative terminal electrically connected to the marginal portion of the other cylinder, and establishing a voltage differential across the gap;

an electrical insulator secured to the cylinders and holding them in the longitudinally spaced relationship; and a hanger strand connected from the top of the first cylinder to hang the apparatus from a support.

4. Ant control apparatus comprising;

first and second cylinders longitudinally spaced along an axis, establishing a circumferential gap between the cylinders, the cylinders having electrically conductive marginal portions at the gap;

an electric battery having a positive terminal electrically connected to the marginal portion of one of the cylinders and a negative terminal electrically connected to the marginal portion of he other cylinder, and establishing a voltage differential across the gap;

an electrical insulator secured to the cylinders and holding them in the longitudinally spaced relationship;

a canister having an upwardly opening cup and a downwardly opening lid having a top with an aperture in the top;

the first cylinder being located in the lid at the aperture;

the second cylinder being located under the first cylinder.

5. The apparatus of claim 4 and further comprising:

an ant attractant in the cup under the cylinders whereby ants crawling down from the first cylinder to the second cylinder to get the attractant, and bridging the gap between the oppositely charged marginal portions of the cylinders will be shocked and drop into the cup.

6. Apparatus having an entry area for a crawling insect and having attractant to the insects, and having a device for interrupting travel of insects along paths from the entry area toward the attractant and including:

a body having upper and lower electrically conductive marginal portions defining a horizontal perimetrical boundary of the paths, each of the marginal portions having a proximal edge extending around the entire perimeter of the boundary and facing the proximal edge of the other of the marginal portions, with a gap between the proximal edges;

a source of electrical energy coupled to the marginal portions and establishing an electrical potential difference across the gap at a voltage level sufficient to shock an insect making a circuit on the insect's body as it crosses the gap and thereby cause the insect to be dislodged and fall;

the source of electrical energy being a battery having a positive terminal electrically connected to one marginal portion, and a negative terminal electrically connected to the other marginal portion;

and wherein:

the body includes upper and lower housings;

the battery is inside the housings and includes first and second dry cells connected electrically in series;

one of the dry cells having one terminal electrically connected to the one marginal portion;

the other of the dry cells having one terminal electrically connected to the other marginal portion.

\* \* \* \* \*